United States Patent
Maneval

(10) Patent No.: US 7,430,746 B2
(45) Date of Patent: Sep. 30, 2008

(54) METHOD FOR OPERATING A FIELD TRANSMITTER

(75) Inventor: Michael Maneval, Schopfheim (DE)

(73) Assignee: Endress & Hauser Process Solutions AG, Reinach (CH)

( * ) Notice: Subject to any disclaimer, the term of this patent is extended or adjusted under 35 U.S.C. 154(b) by 695 days.

(21) Appl. No.: 10/101,109

(22) Filed: Mar. 20, 2002

(65) Prior Publication Data
US 2002/0142719 A1 Oct. 3, 2002

Related U.S. Application Data

(60) Provisional application No. 60/292,532, filed on May 23, 2001.

(30) Foreign Application Priority Data
Mar. 23, 2001 (EP) .................................. 01107313

(51) Int. Cl.
G06F 9/46 (2006.01)
(52) U.S. Cl. ........................ 719/328; 719/319; 455/39
(58) Field of Classification Search ................ 719/310, 719/319, 328, 320; 455/39, 91, 502, 50; 340/870.3, 286.01; 700/3, 17; 348/734
See application file for complete search history.

(56) References Cited

U.S. PATENT DOCUMENTS

| | | | | |
|---|---|---|---|---|
| 3,706,930 A * | 12/1972 | Harner | ................... | 340/538.11 |
| 4,529,980 A * | 7/1985 | Liotine et al. | .......... | 340/825.52 |
| 4,635,333 A * | 1/1987 | Finch | ...................... | 29/890.44 |
| 5,128,855 A * | 7/1992 | Hilber et al. | .................... | 700/3 |
| 5,469,432 A * | 11/1995 | Gat | ............................. | 370/389 |
| 5,528,215 A * | 6/1996 | Siu et al. | ................ | 340/286.01 |
| 5,812,394 A * | 9/1998 | Lewis et al. | .................... | 700/17 |
| 5,963,147 A * | 10/1999 | Westfield et al. | ....... | 340/870.11 |
| 6,088,659 A * | 7/2000 | Kelley et al. | .................. | 702/62 |
| 6,173,325 B1 * | 1/2001 | Kukreja | ...................... | 709/224 |
| 6,437,836 B1 * | 8/2002 | Huang et al. | ................. | 348/734 |
| 6,504,489 B1 * | 1/2003 | Westfield et al. | ......... | 340/870.3 |
| 6,832,380 B1 * | 12/2004 | Lau et al. | ..................... | 719/328 |
| 6,847,826 B1 * | 1/2005 | Wesby et al. | ................ | 455/502 |

FOREIGN PATENT DOCUMENTS

EP 0 992 923 4/2000
WO WO 91/00570 1/1991

OTHER PUBLICATIONS

Brothman et al. "Automatic Remote Reading of Residential Meters" 1965 IEEE, pp. 219-232.☐☐*
Erakovic et al. "A System for Remote Meter Reading and Load Management" 1999 IEEE, pp. 196-199.*
European Search Report, Aug. 30, 2001.

* cited by examiner

Primary Examiner—Van H Nguyen
(74) Attorney, Agent, or Firm—Bacon & Thomas, PLLC

(57) ABSTRACT

A method or system for operating a field transmitter F, in which a application program FA communicates with a field-transmitter s specific software module SW1, SW2, or SW3. The communication is by a defined interface S in order to call standard functionalities of the field transmitter F. An expansion module EW for the application program is provided which is interposed between the application program FA and the field-transmitter specific software module SW1, SW2, or SW3 in order to permit additional functionalities within the context of and using the field-transmitter specific software module SW1, SW2, or SW3.

9 Claims, 2 Drawing Sheets

METHOD FOR OPERATING A FIELD TRANSMITTER

This application relies for priority on a prior filed provisional application, filed May 23, 2001, and assigned Application No. 60/292,532.

FIELD OF THE INVENTION

The invention relates to a method or system for operating a field transmitter.

BACKGROUND OF THE INVENTION

In automation technology, field transmitters are frequently used, which serve for recording and/or influencing process variables. Examples of such field transmitters are level measuring instruments, mass flowmeters, pressure gages, temperature gages etc., which record the corresponding process variables—level, mass flow, pressure and temperature. Process variables are influenced using "actuators" which, in the form of valves, for example, influence the flow of a liquid in a pipeline section.

The field transmitters are generally connected to a central control and engineering system which controls the whole process flow and permits direct access to the individual field transmitters. The control system evaluates and monitors the measured values for the various process variables and drives the appropriate actuators accordingly in order to influence the process.

Data are transmitted between field transmitter and control system on the basis of the known international standards for field buses, such as Hart, Foundation Fieldbus, Profibus, CAN etc.

Automation installations today frequently comprise a multiplicity of different field transmitters from a very wide variety of manufacturers. Before startup, and also during operation, settings need to be made on the field transmitters. These settings frequently have to be made in situ. The individual field transmitter manufacturers each provide different configuration programs for this purpose.

It is an extremely complex and time consuming matter for the user to master the different programs, including the different operating philosophies. Setting the parameters of individual field transmitters or configuring particular field transmitter groups is extremely complex and expensive in an automation installation having a multiplicity of field transmitters, on account of the various communication interfaces and the protocols required.

The configuration, operation and maintenance of a field transmitter in an automation installation should be a much simpler matter.

One aspiration is a plug and play system for field transmitters.

Various field transmitter manufacturers have therefore merged to form PROFIBUS Nutzerorganisation e.V. [PROFIBUS User Organization, a registered association] in order to simplify operation of the field transmitters. The field transmitter manufacturer develops a specific software module for each of his field transmitters, which is supplied to the customer together with the field transmitter. This software module encapsulates all the data and functions of the respective field transmitter. In principle, the field transmitter is a black box, so that third parties cannot access inhouse know-how. In addition, the manufacturer of the unit may also provide his own aspect with this software module. This means that the user interface of the field transmitter always appears the same to the user, irrespective of the runtime environment. The application program used for configuring, operating and maintaining various field transmitters accesses the respective field transmitter software module using a defined interface. One option for the interface specification is indicated in Profibus Guideline—Order No. 2.162, last updated November 2000, obtainable from PROFIBUS Nutzerorganisation e.V., Karlsruhe, to whose content specific reference is made.

Each field transmitter manufacturer supplies his field transmitter together with particular software modules representing the standard functionalities of a field transmitter.

Besides these standard functionalities, the user also requires expansion functionalities, however, particularly in the area of foresighted maintenance, in the installation documentation etc.

These functionalities cannot be called using the normal application program.

SUMMARY OF THE INVENTION

The invention is based on the object of proposing a method or system for operating a field transmitter which is suitable not only for the normal standard functionalities but also for expansion functionalities.

This object is achieved by a method or system for operating a field transmitter, in which an application program communicates with a field-transmitter specific software module using defined interfaces in order to call standard functionalities of the field transmitter, where an expansion module for the application program is provided which is interposed between the application program and the field-transmitter specific software module in order to permit additional functionalities within the context of and using the field-transmitter specific software module.

This means that additional functionalities of the field transmitters can easily be integrated into application programs.

Advantageous further developments of the invention are specified in the dependent claims.

Thus, in one further development, foresighted maintenance or installation documentation, respectively, is provided as additional functionality.

In another further development, data relating to expansion functionalities are additionally stored in a separate database.

In another further development, the expansion module is independent of application program.

In another further development, the application program runs on a Microsoft™ or UNIX™ platform.

In another further development, a plurality of software modules are provided.

BRIEF DESCRIPTION OF THE DRAWINGS

The invention is explained in more detail with the aid of the drawings below, in which.

DESCRIPTION OF THE PREFERRED EMBODIMENT

Figure 1:
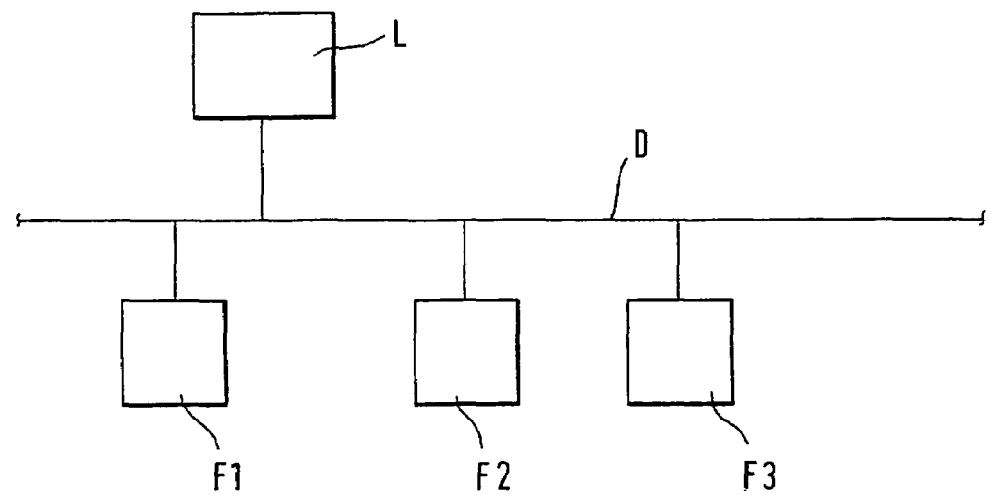
FIG. 1 shows a basic illustration of an automation installation.

FIG. 1 shows a basic illustration of an automation installation. A control system L is connected to a plurality of field transmitters F1, F2, F3 etc. by means of a data bus D. The field transmitters F1-F3 may be, by way of example, pressure gages, temperature gages or flowmeters etc. The control system L communicates with the respective field transmitter, e.g. F1, using the data bus D. In this way, measured values or the parameters of the field transmitter can be transmitted from the field transmitter F1 to the control system L. At the same time, the parameters of the field transmitter F1 can be set from the control system L.

The data communication on the data bus D takes place on the basis of the appropriate international standards, such as Profibus, CAN or FF.

Figure 2:
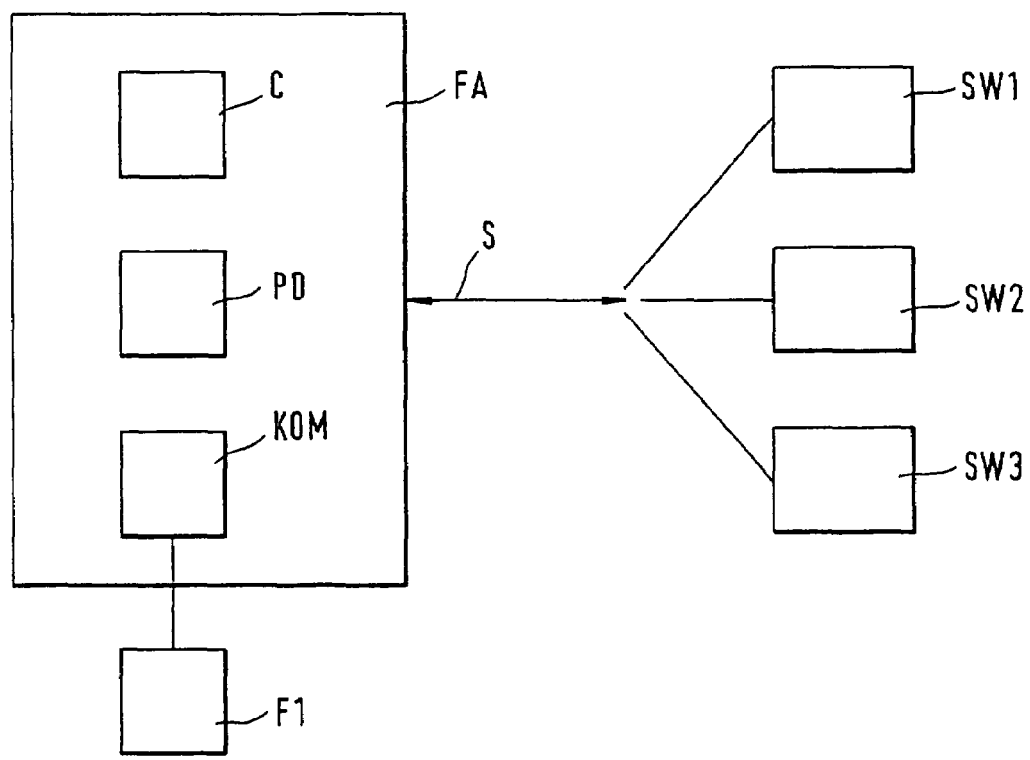
FIG. 2 shows a basic illustration of the software architecture based on the prior art.

FIG. 2 shows a basic illustration of the software architecture.

In principle, the software architecture simulates the automation installation shown in FIG. 1. The application program FA (frame application) corresponds to the control system L. The application program FA comprises a client application C, a project data memory PD and a communication module KOM. The application program FA communicates with field-transmitter specific software modules SW1, SW2, SW3 etc. using a defined interface S. If the client application C requires details relating to particular standard functional modules, it accesses the appropriate software module of the field transmitter, e.g. F1, using the interface S.

Figure 3:
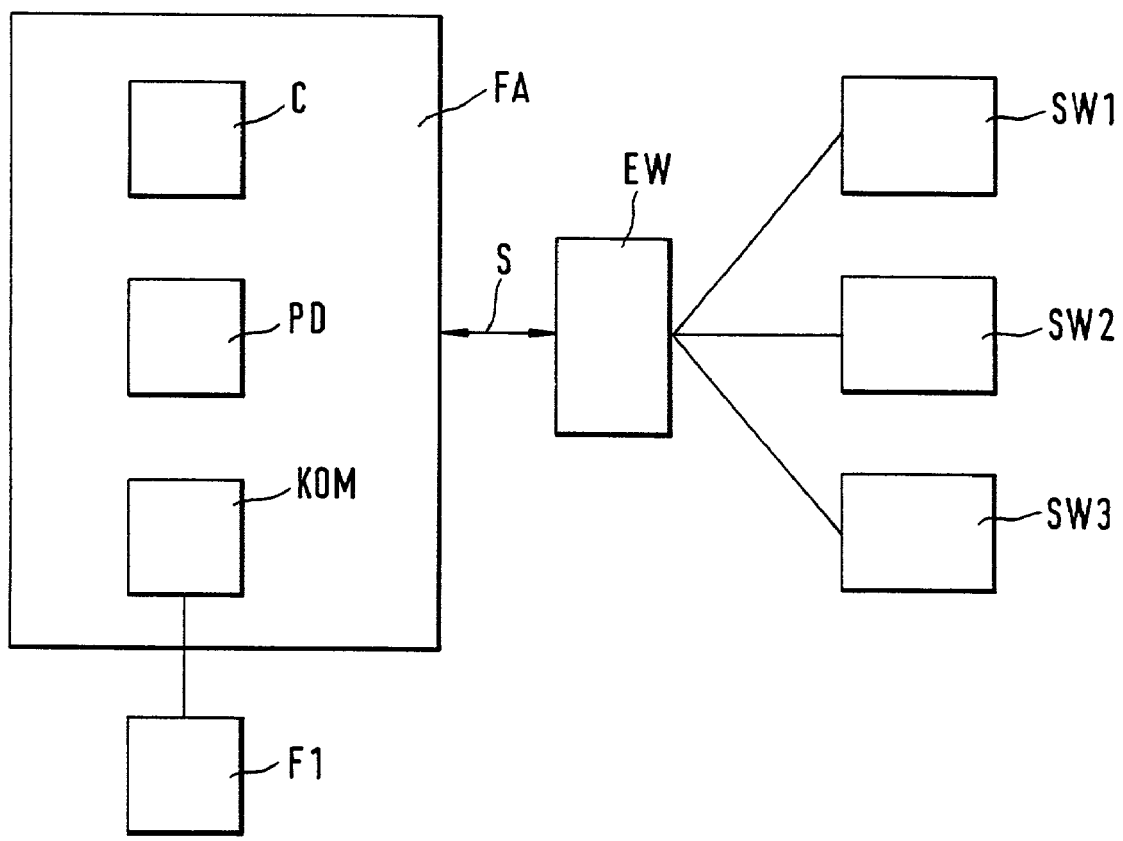
FIG. 3 shows a basic illustration of the software architecture according to the invention.

FIG. 3 corresponds substantially to FIG. 2, with the exception that an expansion module EW is connected between application program FA and software modules. According to the invention, the entire communication with the software modules SW1, SW2, SW3 takes place via the expansion module EW. Standard functions relating to a particular field transmitter are not influenced by the expansion module.

Expansion functionalities are detected by the expansion module EW and are processed in a specific manner.

Hence, company specific functionalities for field transmitters can also be called using the application program FA. The company specific functionalities include, by way of example, foresighted maintenance and installation documentation.

The expansion module provides the user with the option of using particular company specific functionalities for the individual field transmitters. For this purpose, these functionalities need to be enabled by the field transmitter manufacturer. The field transmitter manufacturer can easily provide the user with additional functionalities. This may be done free of charge or on the basis of a license.

Since different field transmitter manufacturers each supply and market their own company specific functionalities, it is certainly useful for a plurality of expansion modules to be able to be interposed between application program and software module.

Expansion functionalities may relate to foresighted maintenance, for example.

Expansion functionalities may relate to installation documentation, for example.

Advantageously, data relating to expansion functionalities can be stored in a separate database.

Advantageously, the expansion module is independent of application program. This means that the expansion program is suitable for different application programs.

It is a simple matter for the application program FA to be an application which runs on a Microsoft or UNIX platform.

The programming may be carried out in component dependent or object oriented fashion.

COM/DCOM is a software component technology which was developed by Microsoft™ and is used worldwide. This technology permits interoperability between software components irrespective of the programming language used. The application is advantageously based on COM technology.

The relevant component technology under UNIX would be CORBA.

The invention claimed is:

1. A system for operating, configuring and maintaining a field transmitter F, comprising:
   a processor;
   a memory coupled to said processor;
   a defined interface S;
   an application program FA which communicates with a field-transmitter specific software module SW1, SW2, or SW3 via said defined interface S;
   said defined interface S being used in order to call standard functionalities of the field transmitter F from the software modules SW1, SW2 or SW3; and
   an expansion module EW for the application program FA which is interposed between the application program FA and the field-transmitter specific software module SW1, SW2, or SW3, whereby said expansion module EW comprises company specific functionalities for the field transmitter F, and whereby the entire communication of the application program FA with the software modules SW1, SW2 or SW3 takes place via said expansion module EW in order to permit besides access to the standard functionalities also access to the company specific functionalities within the context of and using the field-transmitter specific software module SW1, SW2, or SW3.

2. The system as claimed in claim 1, wherein foresighted maintenance is provided as an additional functionality.

3. The system as claimed in claim 1, wherein installation documentation is provided as an additional functionality.

4. The system as claimed in claim 1, wherein the data relating to expansion functionalities are stored in a separate database.

5. The system as claimed in claim 1, wherein the said expansion module EW is independent of said application program FA.

6. The system as claimed in claim 1, wherein the said application program FA runs on a UNIX platform.

7. The system as claimed in claim 1, wherein a plurality of software modules SW1, SW2, and SW3 are provided.

8. The system as claimed in claim 1, wherein the said application program FA runs on a known platform.

9. The system as claimed in claim 1, wherein the system expansion module EW is interposed using the said defined interface S such that the standard functionalities are not influenced.

* * * * *